United States Patent
Shim et al.

(10) Patent No.: US 11,637,296 B2
(45) Date of Patent: Apr. 25, 2023

(54) EJECTOR HAVING A VARIABLE NOZZLE STRUCTURE

(71) Applicants: HYUNDAI MOTOR COMPANY, Seoul (KR); KIA CORPORATION, Seoul (KR)

(72) Inventors: Hyo Sub Shim, Suwon-si (KR); In Tae Park, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/515,016

(22) Filed: Oct. 29, 2021

(65) Prior Publication Data
US 2022/0344682 A1 Oct. 27, 2022

(30) Foreign Application Priority Data
Apr. 22, 2021 (KR) .......... 10-2021-0052348

(51) Int. Cl.
*H01M 8/04* (2016.01)
*H01M 8/04089* (2016.01)
*H01M 8/04082* (2016.01)
*H01M 8/04746* (2016.01)

(52) U.S. Cl.
CPC ... *H01M 8/04097* (2013.01); *H01M 8/04201* (2013.01); *H01M 8/04753* (2013.01)

(58) Field of Classification Search
CPC ......... H01M 8/04097; H01M 8/04201; H01M 8/04753
See application file for complete search history.

(56) References Cited

U.S. PATENT DOCUMENTS

| 2007/0163649 A1 | 7/2007 | Yamagishi et al. |
| 2009/0317691 A1* | 12/2009 | Yamada ............ F04F 5/18 429/444 |

FOREIGN PATENT DOCUMENTS

KR 20060126575 A 12/2006

\* cited by examiner

*Primary Examiner* — Olatunji A Godo
(74) *Attorney, Agent, or Firm* — Lempia Summerfield Katz LLC

(57) ABSTRACT

An ejector has a variable nozzle structure and is installed in a fuel cell recirculation line to supply new hydrogen and a recirculation gas. The ejector includes: a first housing having a first hole through which hydrogen is supplied and an orifice through which the hydrogen is discharged; a second housing disposed in the first housing and having a second hole into which the hydrogen passing through the first hole flows; and a poppet penetrating a third hole defined at one side of the second housing. The poppet is configured to adjust an area of a space opened by the orifice discharging the hydrogen. The hydrogen flowing into the second housing is discharged through a space between the other side opposite to the one side of the second housing and the poppet to move to the orifice.

12 Claims, 4 Drawing Sheets

[ A-A' CROSS-SECTIONAL DIAGRAM ]

EJECTOR HAVING A VARIABLE NOZZLE STRUCTURE

CROSS-REFERENCE TO RELATED APPLICATION

This application claims under 35 U.S.C. § 119(a) the benefit of priority to Korean Patent Application No. 10-2021-0052348 filed on Apr. 22, 2021, the entire contents of which are incorporated herein by reference.

BACKGROUND

(a) Technical Field

The present disclosure relates to an ejector having a variable nozzle structure capable of varying a flow rate of hydrogen discharged by an ejector according to the flow rate of hydrogen provided to the ejector.

(b) Background Art

A hydrogen supply system is a system configured to receive high-pressure hydrogen from a hydrogen tank, to reduce a pressure of the hydrogen to a pressure required by a fuel cell stack, and to supply hydrogen. Main functions of the hydrogen supply system are to sufficiently supply hydrogen required by the fuel cell stack, to recirculate non-reaction hydrogen, and to remove impurities inside the fuel cell stack to increase the purity of hydrogen. To generate the maximum output required by the fuel cell stack, the hydrogen supply system should supply hydrogen equal to or greater than an amount corresponding to the maximum output. To recirculate a non-reaction gas, the hydrogen supply system should recirculate the non-reaction gas using a recirculation component such as a blower or an ejector.

As a means for recirculating hydrogen, a blower may be used. A blower is a component based on a motor. and requiring an actuator. An actuator is expensive and a bearing or other components will be highly likely to corrode by condensate of the recirculation gas.

In the case of using an ejector instead of using a blower, the technology may be simplified to implement the recirculation of hydrogen. To secure recirculation performance in a low-output section and secure the maximum supply performance in a high-output section, a method for increasing a pressure at a front end of the ejector or a method for using two ejectors has been used.

However, the method for increasing the pressure at the hydrogen supply end makes it difficult to secure airtightness at the hydrogen supply end and to maintain internal pressure performance. Further, the method for using two ejectors is disadvantageous in terms of the overall package due to an increase in the size of the hydrogen supply system.

The above information disclosed in this Background section is only to enhance understanding of the background of the disclosure. Accordingly, the Background section may include information that does not form the prior art that is already known in this country to a person of ordinary skill in the art.

SUMMARY OF THE DISCLOSURE

An object of the present disclosure is to provide an ejector having a variable nozzle structure capable of varying a flow rate of hydrogen discharged by an ejector according to the flow rate of hydrogen provided to the ejector.

In an ejector having a variable nozzle structure installed in a fuel cell recirculation line according to an embodiment of the present disclosure is provided to supply new hydrogen and supply a recirculation gas. The ejector having the variable nozzle structure includes: a first housing having a first hole through which hydrogen is supplied and an orifice through which the hydrogen is discharged; a second housing disposed in the first housing and having a second hole into which the hydrogen passing through the first hole flows; and a poppet penetrating a third hole defined at one side, i.e., a first side, of the second housing. The poppet is configured to adjust an area of an opening of the orifice discharging the hydrogen. The hydrogen flowing into the second housing is discharged through a space between the other side, i.e., a second side, opposite to the first side of the second housing and the poppet to move to the orifice.

As an example, the poppet includes a first region penetrating the third hole and a second region adjacent to the second side of the second housing. The hydrogen is discharged through a space between the second region and the second housing.

As an example, the ejector having the variable nozzle structure includes a damage prevention member disposed on a surface of the second region of the poppet to contact the second housing. The damage prevention member contacts or is separated from the second housing according to a pressure applied to the poppet by the hydrogen flowing into the second housing.

As an example, as the pressure applied to the poppet increases, the poppet is moved in a direction away from the orifice. As the poppet is moved in the direction away from the orifice, a distance spaced between the second region and the second housing is increased.

As an example, the first region of the poppet extends in a direction from the second region toward the orifice.

As an example, a cross-sectional area of the second region becomes large as the second region moves away from a point connected to the first region.

As an example, a protrusion protruding toward the poppet is provided on an internal surface of the second housing and a spring is provided between the protrusion and the third hole.

As an example, the ejector having the variable nozzle structure further includes a guide member disposed on a surface of the poppet to guide a position of the poppet in the second housing. The guide member is disposed between the spring and the third hole.

As an example, a plurality of first holes and a plurality of second holes are defined and a flow path connecting the first hole and the second hole is provided.

As an example, the first hole and the second hole are defined to overlap in a direction perpendicular to the direction in which the poppet extends and the direction in which hydrogen passing through the first hole flows into the second hole.

As an example, an airtightness member is disposed between the third hole and the poppet.

As an example, the first housing is inserted into a fourth hole defined in a third housing to which hydrogen is supplied.

An ejector according to an embodiment of the present disclosure may automatically vary the flow rate of hydrogen discharged by the ejector according to the flow rate of hydrogen provided to the ejector. Specifically, the ejector having the variable nozzle structure according to the an embodiment of the present disclosure may include the housing with the 2-stage structure and may automatically control the flow rate of hydrogen discharged through the orifice of the first housing according to the flow rate of hydrogen flowing into the second housing to provide the amount of hydrogen supplied meeting the required output of the fuel cell system.

According to an embodiment of the present disclosure, the flow direction of the fluid (hydrogen) and the pressurized direction of the poppet are the same. Also, the volume of the space between the second housing and the first area of the poppet is not changed. The poppet is thereby stably moved. Further, the guide member may be disposed in the first area to assist the stable movement of the poppet.

According to an embodiment of the present disclosure, the supplied hydrogen is supplied to the first holes of the first housing, the second holes of the second housing, and into the second housing, which is the high-pressure part, by the flow path, such that there is no concern of hydrogen leaking into the first housing or the third housing, which is the relatively low-pressure part. Therefore, it is possible to prevent the phenomenon in which hydrogen leaks from the high-pressure part to the low-pressure part damaging the fuel cell stack.

It should be understood that the terms "automotive" or "vehicular" or other similar terms as used herein are inclusive of motor vehicles in general. Such motor vehicles may encompass passenger automobiles including sports utility vehicles (SUV's), buses, trucks, and various commercial vehicles; watercraft including a variety of boats and ships; aircraft; and the like. Such motor vehicles may also include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example vehicles that are both gasoline-powered and electric-powered.

The above and other features of the disclosure are discussed below.

BRIEF DESCRIPTION OF THE DRAWINGS

The above and other features of the present disclosure are described in detail with reference to certain examples thereof illustrated in the accompanying drawings and given herein below by way of illustration only, and thus are not limitative of the present disclosure, and wherein.

Figure 1:
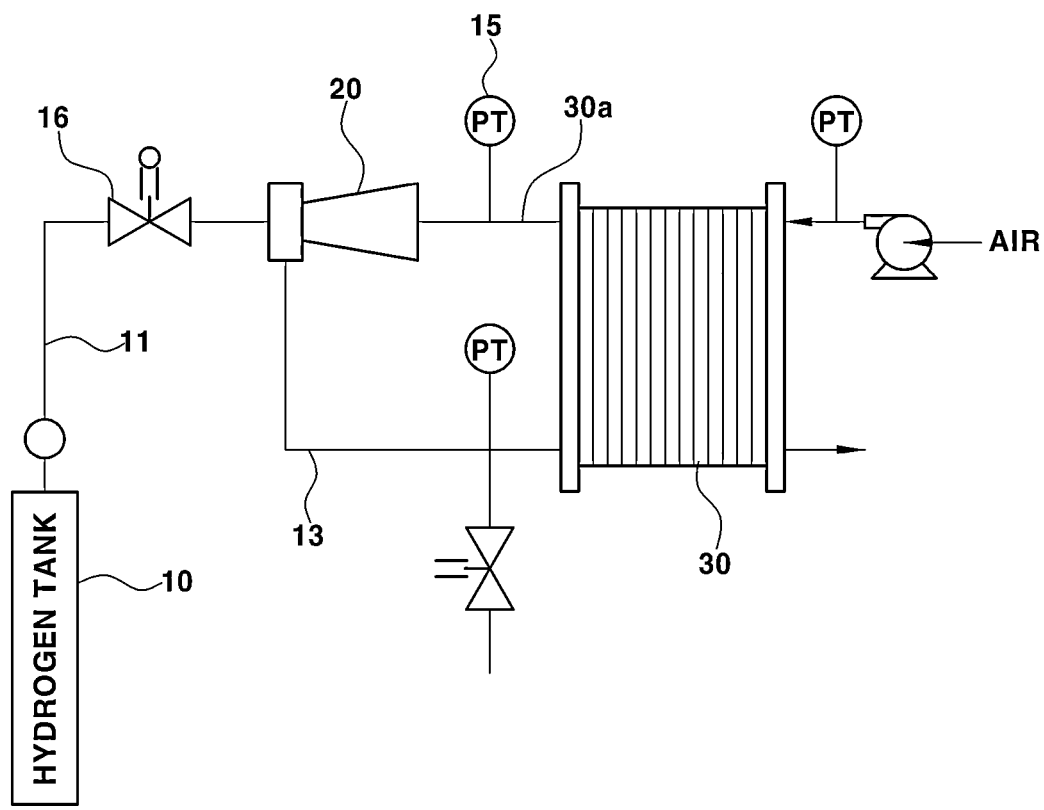
FIG. 1 is a diagram illustrating a basic configuration of a fuel supply and recirculation system in a fuel cell system.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Advantages and features of the present disclosure, and a method of achieving them should become apparent with reference to the embodiments described in detail together with the accompanying drawings. However, the present disclosure is not limited to the embodiments disclosed below but may be implemented in various different forms. The present embodiments are only provided to complete the disclosure of the present inventive concept and to fully inform those having ordinary skill in the art of the scope of the disclosure. The present disclosure is only defined by the scope of the claims. Throughout the entire specification, the same reference numerals refer to the same components.

Further, in the present specification, the names of the components are classified into first, second, etc. to distinguish them where the names of the components have the same relationship and are not necessarily limited to the order thereof in the following description. When a component, device, element, or the like of the present disclosure us described as having a purpose or performing an operation, function, or the like, the component, device, or element should be considered herein as being "configured to" meet that purpose or to perform that operation or function.

The detailed description is illustrative of the present disclosure. Further, the aforementioned contents show and describe embodiments of the present disclosure, and the present disclosure may be used in various other combinations, modifications, and environments. In other words, changes or modifications may be made within the scope of the inventive concept disclosed in the present specification, the scope equivalent to the disclosed contents, and/or within the scope of technology or knowledge in the art. The described embodiments explain a mode for implementing the technical spirit of the present disclosure. Various changes required in the specific application fields and uses of the present disclosure are also possible. Therefore, the detailed description of the disclosure is not intended to limit the present disclosure to the disclosed embodiments. Further, the appended claims should be construed as also including other embodiments.

FIG. 1 is a diagram illustrating a basic configuration of a fuel supply and recirculation system in a fuel cell system.

Referring to FIG. 1, a hydrogen supply system may perform a fuel supply process of supplying hydrogen to a fuel cell stack 30 and a process of recirculating hydrogen not reacted in the fuel cell stack 30. The hydrogen supply system may include: a hydrogen supply line 11 connected to a hydrogen storage tank 10; a hydrogen recirculation line 13 through which the hydrogen not reacted in the fuel cell stack 30 is recirculated; an ejector 20 mounted at a point where a stack inlet 30a and the hydrogen recirculation line 13 meet to pump and supply new hydrogen and recirculation hydrogen to an anode of the fuel cell stack 30; a stack inlet side pressure sensor 15 mounted on the stack inlet 30a to measure hydrogen and an air pressure; a regulator 16 mounted on the hydrogen supply line 11, and the like.

The ejector 20 may receive primarily depressurized hydrogen through the high-pressure regulator 16, generate a vacuum by spraying the supplied compression hydrogen through a nozzle, and recirculate hydrogen gas by sucking a discharge gas in the fuel cell stack 30 using the above. In other words, the ejector 20 may provide all of the newly supplied hydrogen and the hydrogen not reacted in the fuel cell stack 30 to the fuel cell stack 30. The ejector 20 may spray a jet through the nozzle using a pressure at a rear end of the high-pressure regulator 16 to generate a momentum required for recirculation while supplying a fuel. A specific configuration of the ejector 20 is described below.

Figure 2:
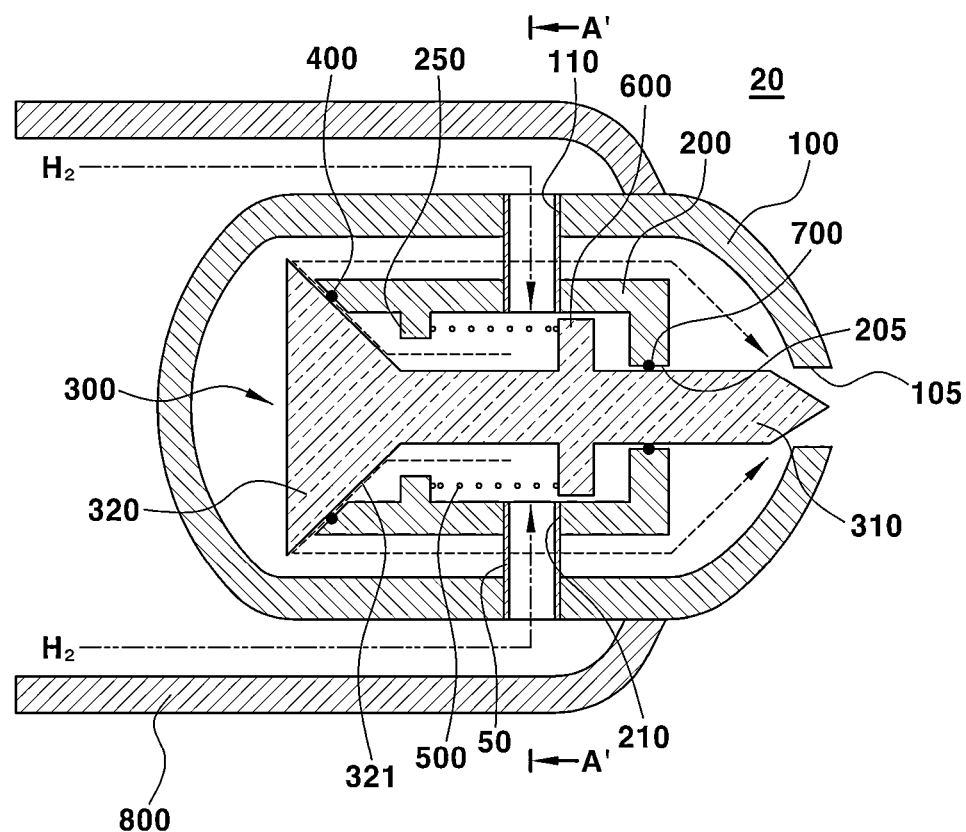
FIG. 2 is a diagram illustrating an ejector having a variable nozzle structure according to an embodiment of the present disclosure.

FIG. 2 is a diagram illustrating an ejector having a variable nozzle structure according to an embodiment of the present disclosure.

Referring to FIG. 2, the ejector 20 may include a first housing 100, a second housing 200, a poppet 300, a damage prevention member 400, a spring 500, and a guide member 600. The second housing 200 may be disposed in the first housing 100 and the spring 500 and the guide member 600 may be disposed in the first housing 100. A pressure applied to the poppet 300 may be changed according to a flow rate of the hydrogen flowing into the second housing 200. As the poppet 300 moves according to the pressure applied to the poppet 300, a flow rate of the hydrogen discharged by the ejector 200 may be adjusted.

An orifice 105, which is a passage through which hydrogen is discharged to the outside of the ejector 20, and a first hole 110, which is configured to supply hydrogen to the second housing 200, may be defined in the first housing 100. A plurality of first holes 110 may be formed in the first housing 100. The orifice 105 and the poppet 300 are components configured to adjust the flow rate of hydrogen discharged in which, as the poppet 300 moves in a horizontal direction, the flow rate of hydrogen discharged through the orifice 105 may be controlled.

A second hole 210 configured to flow the hydrogen supplied through the first hole 110 of the first housing 100 into the second housing 200 may be defined in the second housing 200. A plurality of second holes 210 may be formed in the second housing 200. The hydrogen passing through the first hole 110 may move to the second hole 210 through a flow path 50 connecting the first hole 110 and the second hole 210. The hydrogen passing through the second hole 210 may flow into the second housing 200. The first hole 110 and the second hole 210 may be defined to overlap in a direction perpendicular to a direction in which the poppet 300 extends. At this time, the direction in which the poppet 300 extends may mean a horizontal direction in the drawing and mean a direction from the poppet 300 toward the orifice 105. The flow path 50 may be formed in the same number as the number of first holes 110 and second holes 210.

A third hole 205 through which the poppet 300 penetrates may be defined at one side (i.e., a first side) of the second housing 200 and the other side (i.e., the second side) of the second housing 200 opposite to the one side may be opened. One side (i.e., the first side) of the second housing 200 may mean a region closer to the orifice 105 than the other side.

The poppet 300 may adjust an area of a space opened by the orifice 105 discharging hydrogen. The poppet 300 is not a component inserted into the orifice 105 to fully close the orifice 105, but instead an end of the poppet 300 may partially close the orifice 105. In other words, if the flow rate of the hydrogen supplied to the second housing 200 is small, the pressure applied to the poppet 300 is low and the poppet 300 may not be moved and hydrogen may be discharged through the orifice 105 partially closed by the poppet 300. The poppet 300 may include a first region 310 penetrating the third hole 205 of the second housing 200 and a second region 320 adjacent to the other side of the second housing 200. The first region 310 of the poppet 300 may extend in a direction from the second region 320 toward the orifice 105. A cross-sectional area of the second region 320 may be the same as or larger than a cross-sectional area of the first region 310. The cross-sectional area of the second region 320 may increase as the second region 320 moves away from the point connected to the first region 310.

The hydrogen flowing into the second housing 200 may be discharged to a space between the second region 320 of the poppet 300 and the other side of the second housing 200. In other words, the second region 320 may serve to partially close the opened other side (i.e., second side) of the second housing 200. The damage prevention member 400 may be disposed on a surface 321 of the second region 320 of the poppet 300. As the second region 320 of the poppet 300 directly contacts the other side of the second housing 200, the damage prevention member 400 may prevent the poppet 300 or the second housing 200 from being damaged. In other words, the damage prevention member 400 may physically contact the other side (i.e., the second side) of the second housing 200. The damage prevention member 400 may contact or be separated from the other side of the second housing 200 according to the pressure applied to the poppet 300 by the hydrogen flowing into the second housing 200.

A protrusion 250 protruding toward the poppet 300 may be provided on an internal surface of the second housing 200. The spring 500 may be provided between the protrusion 250 and the one side (i.e., the first side) of the second housing 200 or the third hole 205. Further, the guide member 600 disposed on the surface of the poppet 300 to guide a position of the poppet 300 in the second housing 200 may be provided. The spring 500 may be disposed to surround the surface of the poppet 300. The spring 500 may be disposed to surround a surface of the first region 310 of the poppet 300. The spring 500 may be disposed in a space between the protrusion 250 and the guide member 600. One end of the spring 500 may contact the protrusion 250 and the other end of the spring 500 may contact the guide member 600. The poppet 300 may move according to the pressure applied to the poppet 300 by the spring 500 and the damage prevention member 400 may contact or be separated from the other side of the second housing 200 according to the movement of the poppet 300. In other words, the spring 500 may move the poppet 300 according to the pressure applied to the poppet 300.

The guide member 600 may guide a position of the poppet 300 in the internal space of the second housing 200. The poppet 300 may be ideally disposed on a center portion of the internal space of the second housing 200. Therefore, the guide member 600 may be disposed on the surface of the first region 310 of the poppet 300 to guide the position of the poppet 300. The guide member 600 may be disposed between the spring 500 and the third hole 205.

An airtightness member 700 may be disposed between the third hole 205 of the second housing 200 and the poppet 300. Specifically, to prevent hydrogen from leaking between the third hole 205 and the first region 310 of the poppet 300, the airtightness member 700 may be provided. The airtightness member 700 may be provided on one surface of the second housing 200 exposed by the third hole 205.

The ejector 20 may include a third housing 800 defining a shape of an external surface. A fourth hole (not illustrated) into which the first housing 100 is inserted may be defined in the third housing 800. The third housing 800 may be a component receiving hydrogen from the high-pressure regulator or the fuel cell stack.

According to an embodiment of the present disclosure, the flow direction of the fluid (hydrogen) and the pressurized direction of the poppet 300 are the same. Also, the volume of the space between the second housing 200 and the first region 310 of the poppet 300 is not changed, such that the poppet 300 may be stably moved. Further, the guide member 600 may be disposed in the first region 310 to assist the stable movement of the poppet 300.

According to an embodiment of the present disclosure, a friction between the first region 310 of the poppet 300 and the second housing 200 upon movement of the poppet 300 occurs only in the airtightness member 700. Thus, the friction between the poppet 300 and the second housing 200 may be minimized, thereby being advantageous in terms of the movability of the poppet 300.

Figure 3:
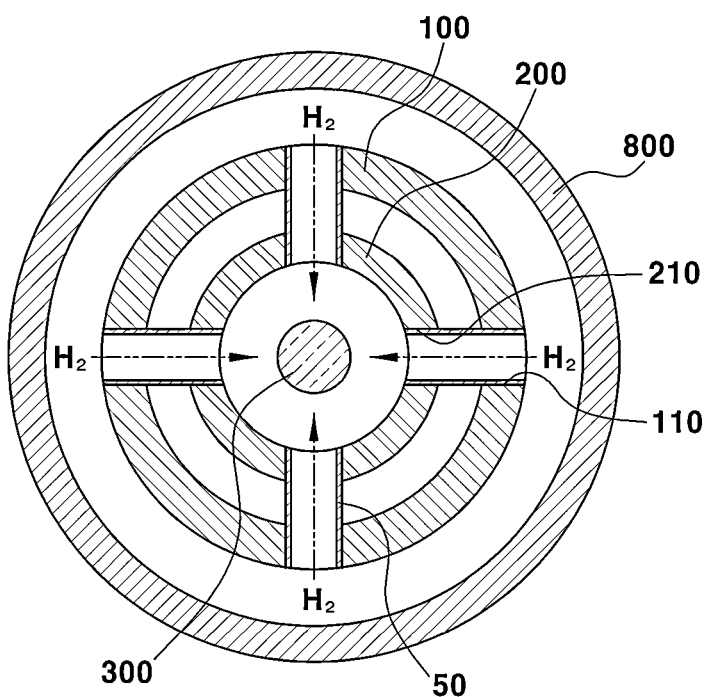
FIG. 3 is a diagram illustrating a surface taken along a line A-A' of the ejector illustrated in FIG. 2.

FIG. 3 is a diagram illustrating a surface taken along line A-A' illustrated in FIG. 2.

Referring to FIGS. 2 and 3, the first housing 100 may be disposed in the third housing 800 and the second housing 200 may be disposed in the first housing 100. A plurality of first holes 110 may be defined in the first housing 100 and a plurality of second holes 210 may be defined in the second housing 200. The flow paths 50 connecting the first holes 110 and the second holes 210 may be formed in the same number as the number of first holes 110 and second holes 210 each formed. The hydrogen flowing into the third housing 800 may pass through the first hole 110, the flow path 50, and the second hole 210 in sequence to flow into the second housing 200. The hydrogen flowing into the second housing 200 may move the poppet 300 and the hydrogen may be discharged to the space between the poppet 300 and the other side (i.e., the second side) of the second housing 200 by the movement of the poppet 300. The hydrogen discharged to the space between the poppet 300 and the other side of the second housing 200 may be discharged through the orifice 105 defined in the first housing 100.

According to an embodiment of the present disclosure, the supplied hydrogen is supplied into the second housing 200 by the first holes 110 of the first housing 100, the second holes 210 of the second housing 200, and the flow path 50, such that there is no concern of hydrogen leaking into the first housing 100 or the third housing 800, which is a relatively low-pressure portion. Therefore, it is possible to prevent the phenomenon in which hydrogen is leaked from the high-pressure portion to the low-pressure portion, which would otherwise damage the fuel cell stack.

Figure 4:
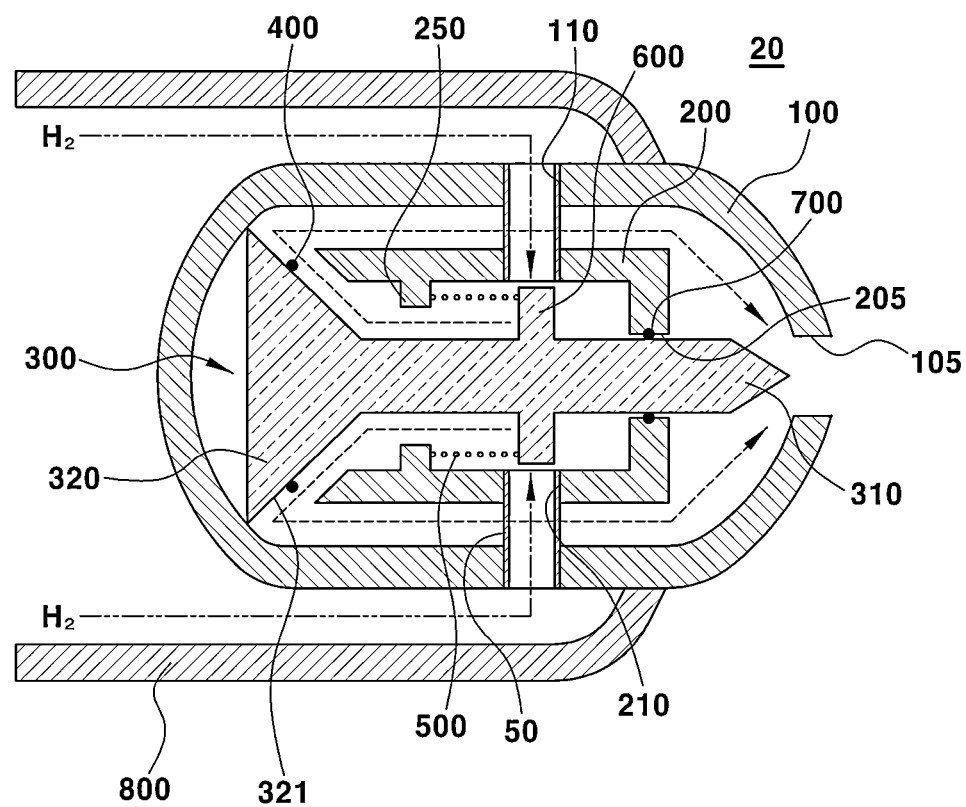
FIG. 4 is a diagram illustrating an ejector having a variable nozzle structure according to another embodiment of the present disclosure.

FIG. 4 is a diagram illustrating an ejector having a variable nozzle structure according to another embodiment of the present disclosure. The description of overlapping contents is omitted for simplification of the description.

FIG. 4 is a diagram for explaining a case of having a larger amount of hydrogen flowing into the second housing 200 than that in FIG. 2. Referring to FIG. 4, when the flow rate of the hydrogen flowing into the second housing 200 increases, the pressure applied to the poppet 300 may be increased. When the pressure applied to the poppet 300 is increased, the poppet 300 may be moved in a direction away from the orifice 105. As the poppet 300 is moved in the direction away from the orifice 105, a distance spaced between the damage prevention member 400 and the other side of the second housing 200 may be increased. Also, an amount of hydrogen discharged between the second region 320 of the poppet 300 and the other side of the second housing 200 may be increased. Further, when an amount of hydrogen flowing into the second housing 200 is increased, the poppet 300 blocking the orifice 105 may be moved in the direction away from the orifice 105. Therefore, the flow rate of the hydrogen discharged through the orifice 105 may be increased.

According to an embodiment of the present disclosure, the fuel cell system is operated in various output conditions.

First, in a low-output section, to enhance suction performance of the ejector, an area of the orifice 105 discharging hydrogen should be small. In a high-output section, to ensure that there is no shortage of the flow rate, the area of the orifice 105 should be large. In the case of the low-output section, an amount of poppet movement is small because a force pushing the poppet 300 is weak due to a low pressure at a front end of the ejector. Thus, since an area in which the end of the poppet 300 blocks the orifice 105 is large, an area in which hydrogen may move is relatively small. However, if the output of the fuel cell system is high, the pressure at the front end of the ejector increases and the force at which hydrogen pushes the poppet 300 increases. Thus, an amount of poppet 300 movement becomes large. Therefore, the area in which the end of the poppet 300 blocks the orifice 105 is reduced, such that the area in which hydrogen may move becomes relatively large. In other words, the flow rate of the hydrogen discharged through the orifice 105 of the first housing 100 may be automatically controlled according to the flow rate of the hydrogen flowing into the second housing 200. Implementing an ejector capable of providing an amount of hydrogen supplied thereby meets the required output of the fuel cell system.

As described above, embodiments of the present disclosure have been described with reference to the accompanying drawings. However, those having ordinary skill in the art to which the present disclosure pertains should understand that the present disclosure may be carried out in other specific forms without changing the technical spirit or essential features thereof. Therefore, it should be understood that the aforementioned embodiments are illustrative and non-limiting in all respects.

What is claimed is:

1. An ejector having a variable nozzle structure installed in a fuel cell recirculation line to supply new hydrogen and supply recirculation gas, the ejector comprising:
    a first housing having a first hole through which hydrogen is supplied and an orifice through which the hydrogen is discharged;
    a second housing disposed in the first housing, the second housing having a second hole into which the hydrogen passing through the first hole flows; and
    a poppet penetrating a third hole defined at one side of the second housing and configured to adjust an area of a space opened by the orifice discharging the hydrogen,
    wherein the hydrogen flowing into the second housing is discharged through a space between another side opposite to one side of the second housing and the poppet to move to the orifice.

2. The ejector of claim 1,
    wherein the poppet comprises a first region penetrating the third hole and a second region adjacent to the other side of the second housing, and
    wherein the hydrogen is discharged through a space between the second region and the second housing.

3. The ejector of claim 2, further comprising:
    a damage prevention member disposed on a surface of the second region of the poppet to contact the second housing,
    wherein the damage prevention member contacts or is separated from the second housing according to a pressure applied to the poppet by the hydrogen flowing into the second housing.

4. The ejector of claim 3,
    wherein, as the pressure applied to the poppet increases, the poppet is moved in a direction away from the orifice, and wherein, as the poppet is moved in the direction away from the orifice, a distance spaced between the second region and the second housing is increased.

5. The ejector of claim 2,
wherein the first region of the poppet extends in a direction from the second region toward the orifice.

6. The ejector of claim 5,
wherein a cross-sectional area of the second region becomes larger as the second region moves away from a point connected to the first region.

7. The ejector of claim 1,
wherein a protrusion protruding toward the poppet is provided on an internal surface of the second housing, and
wherein a spring is provided between the protrusion and the third hole.

8. The ejector of claim 7, further comprising:
a guide member disposed on a surface of the poppet to guide a position of the poppet in the second housing,
wherein the guide member is disposed between the spring and the third hole.

9. The ejector of claim 1,
wherein a plurality of first holes and a plurality of second holes are defined, and
wherein a flow path connecting the first hole and the second hole is provided.

10. The ejector of claim 9,
wherein the first hole and the second hole are defined to overlap in a direction perpendicular to the direction in which the poppet extends and the direction in which hydrogen passing through the first hole flows into the second hole.

11. The ejector of claim 1,
wherein an airtightness member is disposed between the third hole and the poppet.

12. The ejector of claim 1,
wherein the first housing is inserted into a fourth hole defined in a third housing to which hydrogen is supplied.

* * * * *